United States Patent [19]

Yoshino

[11] Patent Number: 5,701,652
[45] Date of Patent: Dec. 30, 1997

[54] DISMOUNT METHOD OF LARGE-SIZED TANK BY CUTTING THE SAME AND JACK MECHANISM EMPLOYED THEREFOR

[75] Inventor: Yoshihide Yoshino, Tokyo, Japan

[73] Assignee: Bestera K.K., Tokyo, Japan

[21] Appl. No.: 518,890

[22] Filed: Aug. 24, 1995

[30] Foreign Application Priority Data

Aug. 24, 1994 [JP] Japan .................................. 6-220832
Oct. 20, 1994 [JP] Japan .................................. 6-279831

[51] Int. Cl.[6] .................................................. B23P 19/02
[52] U.S. Cl. ................................... 29/426.3; 29/426.4
[58] Field of Search ........................... 29/426.3, 426.4; 219/68

[56] References Cited

U.S. PATENT DOCUMENTS 5,394,598  3/1995  Kato ............................. 29/426.4

*Primary Examiner*—Joseph M. Gorski
*Attorney, Agent, or Firm*—Birch, Stewart, Kolasch & Birch, LLP

[57] ABSTRACT

A dismount method of a large-sized tank by cutting is disclosed. The dismount method contains a cutting step of cutting the tank main body successively from a top at an almost central position so as to draw a swirl cut line to a bottom thereof to form a band with a predetermined width.

4 Claims, 7 Drawing Sheets

PRIOR ART

1

DISMOUNT METHOD OF LARGE-SIZED TANK BY CUTTING THE SAME AND JACK MECHANISM EMPLOYED THEREFOR

BACKGROUND OF THE INVENTION

1. Field of the Invention

The present invention relates to a method for dismounting by cutting a gas tank or a tank main body of a large-sized tank for storing liquid, and a jack mechanism for jacking up the main body of the tank in the dismounting course.

2. Discussion of Background

Large-sized tanks, such as a gas tank, with a spherical or cylindrical shape are widely employed as installations for storing a large amount of gas or liquid.

The above-mentioned large-sized tanks, for instance, are made of a metal or a composite material of a metal and a heat insulation material, which cannot be prevented from a secular change. Accordingly, it is necessary to dismount the old installation and construct a new one at intervals of a predetermined years such as every 20 years in order to secure the safety.

When the large-sized tank is dismounted, it is most important to dismount a shell body as a tank main body with a predetermined thickness.

Figure 21:
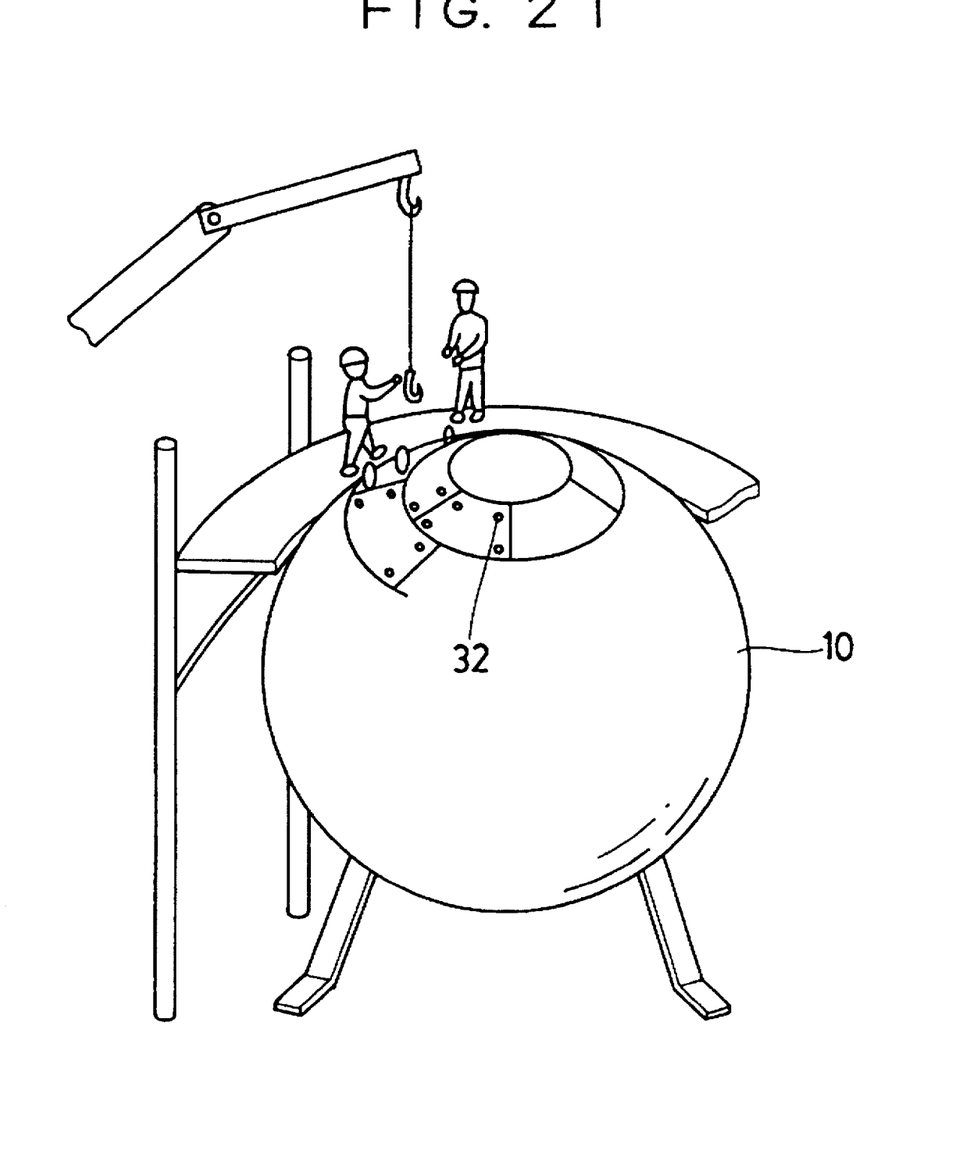
FIG. 21 is a diagram for explaining a conventional dismount method of a large-sized tank with a spherical shaped tank main body.

A conventional method has been employed in that, as shown in FIG. 21, a shell body 10 as a tank main body is cut into pieces with a predetermined size by use of a burner or the like, a plurality of suspension pieces 32 called shackles are attached on each of the fragments of the tank main body at the outer surface thereof, and each of the fragments is carried one by one using the suspension pieces 32 suspended by a crane truck.

In the case where the above-mentioned conventional dismount method by cutting is employed, the operators first go up to the top of the tank main body to perform the cutting operation as well as the fixing operation of the suspension pieces 32, followed by suspending the fragments of the tank main body by a crane truck.

Therefore, it is inevitable that the conventional dismount operation is carried out at an elevated spot for an extended period of time. Besides, it is necessary to prepare a large-scaled scaffold provided around the large-sized tank. When there is no satisfactory space around the large-sized tank, the operation by the crane truck becomes extremely difficult with the motion of the crane truck limited.

Moreover, this conventional method requires the repetition of cutting the shell body 10 into fragments with a predetermined size and suspending the same for conveying, which takes long time and may adversely affect the neighborhood. Furthermore, the cost of dismounting is very large.

In addition to above, it is very difficult and time consuming to prepare a scaffold, particularly to dismount such a large-sized tank in the spherical shape as shown in FIG. 21, since the side wall of spherical tank is curved unlike that of the cylindrical tank.

SUMMARY OF THE INVENTION

It is therefore a first object of the present invention to provide a dismount method of a large-sized tank by that the large-sized tank can be speedily and smoothly dismounted with the labor lightened, and the quantity of operation carried out at an elevated spot is reduced.

A second object of the present invention is to provide a jack mechanism employed for a dismount method.

The first object of the present invention is attained by a dismount method of a large-sized tank for storage by cutting a tank main body. The method comprises: a cutting step of cutting the tank main body successively from a top at an almost central position to a bottom thereof so as to draw a swirl cut line to form a band with a predetermined width.

The first object of the present invention is also attained by a dismount method of a large-sized tank, by cutting a spherical shaped tank main body and a plurality of supporting legs for supporting the spherical shaped tank main body at a predetermined height. The method comprises: a supporting preparatory step of preparing the tank main body being supported from the bottom thereof by use of supporting means, a detaching step from the ground of cutting off the supporting legs to support the tank main body only by the supporting force of the supporting means; and a cutting step of cutting the tank main body from the lower edge side toward the upper part thereof simultaneously with the supporting height of the tank main body being lowered.

The second object of the present invention is attained by a jack mechanism a for supporting a spherical tank main body of a large-sized tank from the inside thereof when the spherical tank main body is dismounted by cutting. The jack mechanism comprises: a plurality of extendable supporting posts for supporting the spherical tank main body by pushing up the same, an ascent and descent unit for causing each upper end of the extendable supporting posts to move up and down provided on the back side of the extendable supporting posts, rotation members for rotating the spherical tank main body in the horizontal direction, under the state of contacting with the inner surface of the tank main body, each provided on the top of the extendable supporting post, and a rotary driving unit for rotary driving at least one of the rotation members provided in a contact state with the extendable supporting post.

The second object of the present invention is also attained by a jack mechanism for supporting a spherical tank main body of a large-sized tank from the inside thereof when the spherical tank main body is dismounted by cutting. The jack mechanism comprises: a substrate which is rotatable in the horizontal direction, at least one extendable supporting post for supporting the spherical tank main body by pushing up the same provided on the substrate an ascent and descent unit for causing the upper end of the extendable supporting post to move up and down provided on the back side of the extendable supporting post, and a substrate driving unit for rotating the substrate with the spherical tank main body supported by the extendable supporting post, provided on the back surface of the substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In the present invention, dismount methods of a large-sized tank by cutting are proposed.

A tank for storage is dismounted in accordance with a first dismount method by cutting of the present The method comprises: a cutting step of cutting the tank main body successively from a top at an almost central position to a bottom so as to draw a swirl cut line to form a band with a predetermined width.

Figure 1:
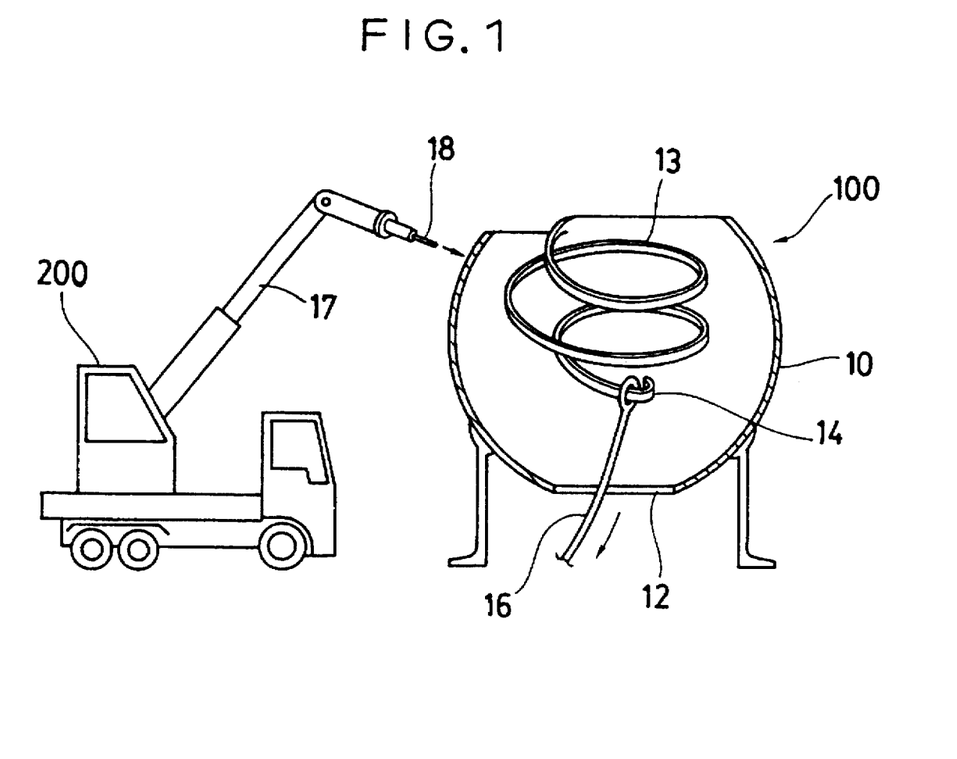
FIG. 1 is a diagram for explaining an embodiment of the dismounting operation of a large-sized tank with an almost spherical shaped tank main body.

FIG. 1 is a diagram for showing the embodiment in which a large-sized tank 100 with a spherical shaped tank main body is dismounted. More specifically, FIG. 1 shows that an almost spherical-shaped shell body 10 as a tank main body is in the course of being cut. Such shell body 10 of the gas tank 100 is made of a metal or a resin to have a thickness of e.g. 9 mm to 30 mm, which can be cut by means of a burner or the like. A circular opening 12 has been prepared by cutting at the bottom of the shell body 10.

Figure 2:
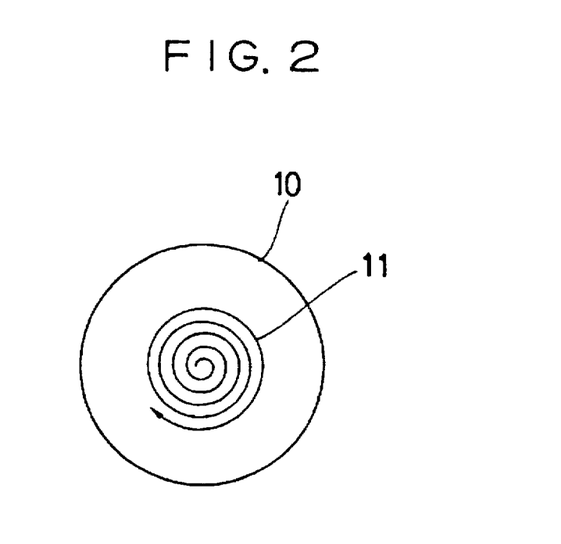
FIG. 2 is a diagram for explaining a swirl line drawn when a spherical shaped tank main body is cut.

A cutting step is started from the top portion of the shell body 10 at an almost central position thereof toward the bottom of the side wall portion, drawing a swirl line 11 as shown in FIG. 2. As the above described cutting step is progressively made, the cut part which is formed as a band 13 is gradually bent and fallen from the free end 14 thereof into the shell body 10, owing to its weight. Accordingly, it is possible to complete the continuous dismount operation, with the cut portion fallen onto the ground in succession. Therefore, the troublesome operation to convey each fragment formed by cutting the tank main body is eliminated, and it is possible to dismount a large-sized tank in accordance with extremely simple operation. As a result, the number of the dismounting operators at an elevated spot is decreased and the working hours is shortened to a large extent in comparison with the operation by a conventional method.

It is preferable to perform a pull down step for positively pulling down the band 13 cut in the course of cutting step. In this case, the pulling down operation is carried out to pull down the free end 14 of the band 13. For instance, a substance such as a wire 16 hung on the free end 14 is pulled downward, or conventional mechanical means is employed in this operation. It is possible to carry out the above-mentioned pulling down operation without the necessity of much force, since this is performed utilizing the weight of the band itself.

As can be seen from the above, the shell body 10 as the tank main body can be peeled off with forming a band with a predetermined width in the swirl form in accordance with the method like peeling off an apple, so that the dismounting operation can successively be performed.

Thus, the cutting operation step is continued in succession, accompanied with the pulling down operation, thereby completing the dismounting of the shell body 10 to the bottom thereof.

It is obvious that the operator can perform the operation in the cutting step in such a manner as shown in FIG. 21 where they go up to the top of the shell body 10. Alternatively, it is possible to automatically carry out this operation by means of an automatic apparatus 200 with a heat dissipation portion 18 such as a burner provided at the tip of an arm portion 17 thereof, shown in FIG. 1. Using such automatic apparatus 200, it is possible that the operators can dismount the tank with almost no operation at an elevated spot.

In addition to the above, it is preferable that the width of the band which is formed as a cut part along the swirl line 11 be appropriately adjusted depending upon he size and thickness of the shell body 10. For instance, the thicker the shell body 10, the narrower the width of the band is set.

In the pull down step of the dismount operation described above, the band can be pulled into the inner direction of the shell body 10 utilizing the weight thereof, so that the adverse effect to the environment around the tank or to the neighborhood is restrained to a minimum extent. It is unnecessary to perform the conveying operation by pulling up the band by use of a crane truck from the upper part in this case. Thus, the dismount operation can be carried out since the band is fallen into the tank main body even without the provision of a large space around the tank 100.

Figure 3:
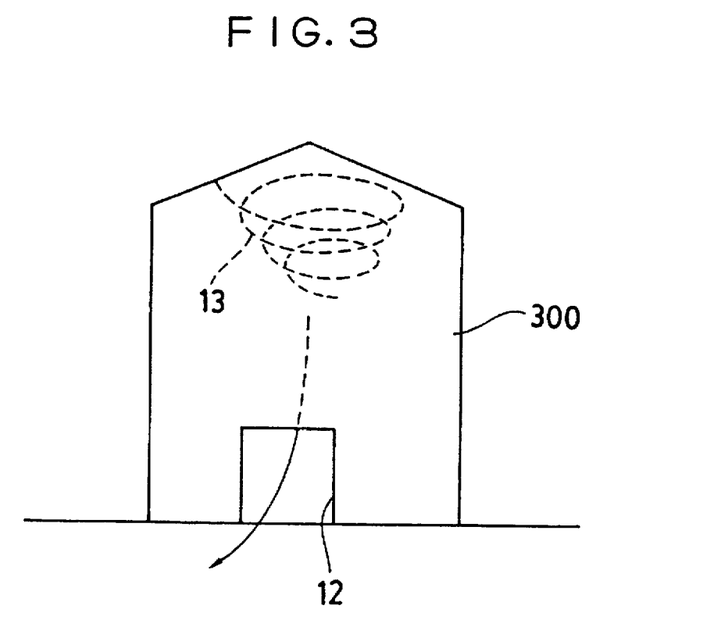
FIG. 3 is a diagram for explaining an embodiment of dismounting a large-sized tank with a conical-shaped top portion.
Figure 4:
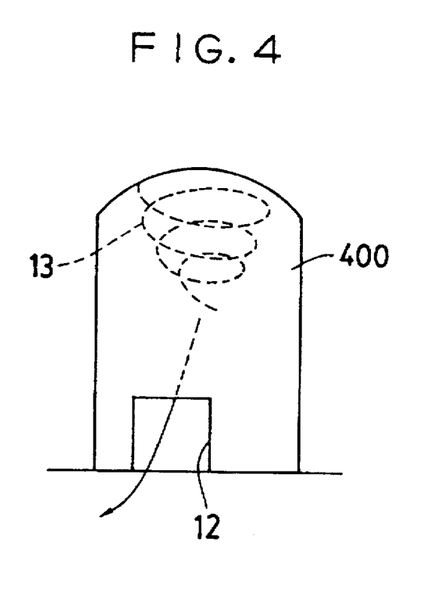
FIGS. 4 and 5 are diagrams for respectively explaining an embodiment of dismounting a large-sized tank with a top portion in the shape of a dome, and an embodiment of dismounting a cylindrical shaped side wall of the large-sized tank.
Figure 5:
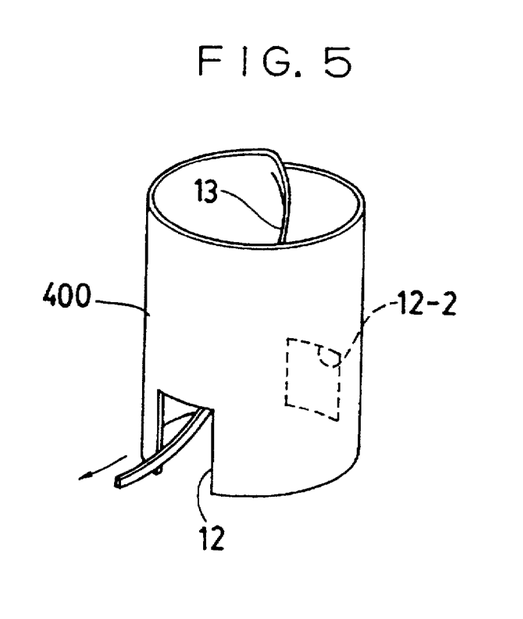

FIGS. 3, 4 and 5 are diagrams for showing the dismounting operation of tanks with different shapes from the spherical tank described above. FIGS. 3 and 4 schematically show the shapes of the tanks.

It is possible that the dismount method of the present invention further comprises an opening formation step of preparing an opening on the tank main body at the bottom region thereof prior to the pull down step, the pulling down operation of the band in the pull down step is performed by the band located inside of the tank main body being drawn out to the outside from the opening. When the tank main body is a spherical shape, the opening is preferably formed at the bottom thereof by cutting the bottom part in a circular form, while when the tank main body is a cylindrical shape, it is preferable to provide the square shaped opening at the lower part of the side wall part. In either case, the band obtained by cutting the tank main body is drawn out from the opening.

Specifically, FIG. 3 shows an embodiment of a tank 300 with a conical-shaped top portion and cylindrical shaped side wall portion. The tank 300 has an opening 12 at the bottom region of the side wall as shown in FIG. 3. The dismount operation is made progress in such a fashion that the cut operation is performed to draw a swirl cut line seen from the upper part thereof as shown in FIG. 2, in the same way as in FIG. 1, and that the cut portion as a band 13 at the center side of the tank is fallen down by its weight and drawn out from the opening 12.

FIG. 4 shows a tank 400 with a spherical top portion and a cylindrical shaped side wall. An opening 12 is provided at the same part as that in FIG. 3 also in this case, and the pull down operation of a band 13 is performed in the same way as described in FIG. 3.

FIG. 5 shows a tank 400 at the stage of dismounting the side wall after the completion of dismounting the top portion. In such dismount operation, it is difficult to draw out a band 13 cut from the side wall from an opening 12 provided at the same side wall. Therefore, it is possible to provide a second opening 12-2 at a part on the opposing wall portion, and that the band 13 is drawn alternatively from the opposing opening whenever the cutting operation goes a half turn.

As previously mentioned, it has conventionally been necessary to perform such operations that the tank main body is cut into fragments with a predetermined size, suspension pieces are attached to each fragment, followed by pulled up by use of a crane truck. To the contrary, in each embodiment of the present invention, the above described operations becomes unnecessary and the operation time is shortened. Furthermore, the pulling down operation is rapidly performed accelerated by the weight of the band. As a result, it is possible to shorten the time for the dismounting.

In all of the above described embodiments, the band formed by cutting the tank main body is drawn into the tank. Alternatively, it is possible to pull down the band outside of the tank, for instance, in the case of a cylindrical side wall if enough space is there. An embodiment to pull down the band is shown previously in FIG. 1 by use of a substance such as a wire 16 hung on the free end 14 of the band 13. However, the embodiment is not limited to the above, and it is also possible to perform the pulling down operation using an apparatus such as a vehicle which comprises an arm with holding means at the tip thereof.

When a tank to be dismounted comprises a spherical shaped tank main body and a plurality of supporting legs for supporting the same at a predetermined height, a second dismount method of a large-sized tank by cutting of the present invention is employed in the present invention. The second dismount method comprises a supporting preparatory step of preparing the tank main body being supported from the bottom thereof by use of supporting means, a detaching step from the ground of cutting of the supporting legs to support the tank main body only by the supporting force of the supporting means, and a cutting step of cutting the tank main body from the lower edge side toward the upper part thereof simultaneously with the supporting height of the tank main body being lowered.

In the above described supporting preparatory step, the tank main body is brought into a supportable state by supporting means. In order to obtain such state, a variety of supporting means can be employed. For instance, a jack mechanism is usable for pushing up the tank main body from the inside thereof. Alternatively, a crane truck may be used to suspend the tank main body when there is enough space around the tank.

In the detaching step from the ground of the tank main body, the tank main body becomes supportable only by the supporting force of the supporting means. Then, the tank main body is detached from the ground even with the supporting legs cut off. In the cutting step of the tank main body, the tank main body is being cut from the lower portion toward the upper part thereof. Thus, a large-scaled preparatory operation, for instance, to prepare a scaffold employed for the operation at an elevated spot is unnecessary. The dismount operation of the upper part of the tank can be also carried out in a low spot since the supporting height of the tank main body is lowered accompanied with the cutting operation in the cutting step.

FIGS. 6 to 9 show specific embodiments of the second dismount method of the present invention having basic steps for dismounting a spherical shaped tank main body of a large-sized tank.

Figure 6:
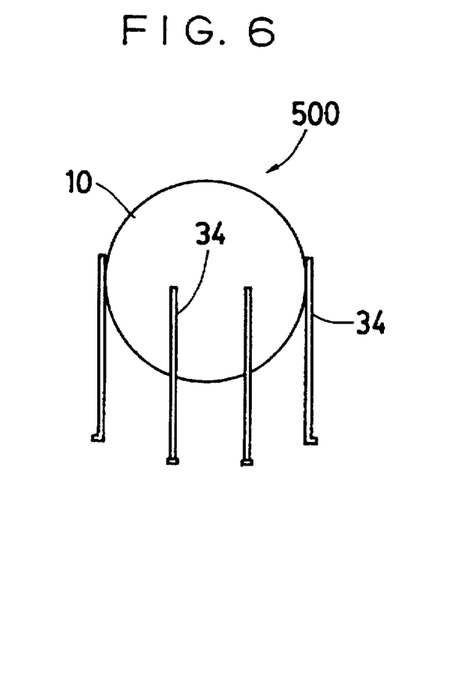
FIG. 6 is a diagram for explaining the installed state of a generally employed large-sized tank with a spherical shaped tank main body.

FIG. 6 shows the installed state of a generally employed large-sized tank 500 with a spherical shaped tank main body 10.

As is shown in FIG. 6, a tank main body is a hollow spherical shaped shell body 10 supported at a predetermined height by a plurality of supporting legs 34. A passage for inspecting the tank, which is not shown, is usually provided around the tank 500 at a slightly upper position of the center line (the equator line) thereof.

Figure 7:
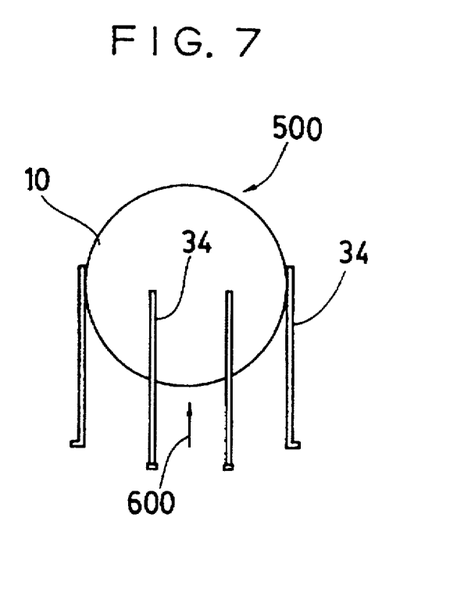
FIG. 7 is a diagram for explaining a supporting preparatory step of supporting the spherical shaped tank main body.

FIG. 7 shows a supporting preparatory step of the tank 500 with a spherical shell body in which the tank shell body 10 is made to have a supportable state by use of supporting means (not shown) while being supported by the supporting legs. Namely, a predetermined quantity of supporting force is maintained in the direction of an arrow 600.

Figure 8:
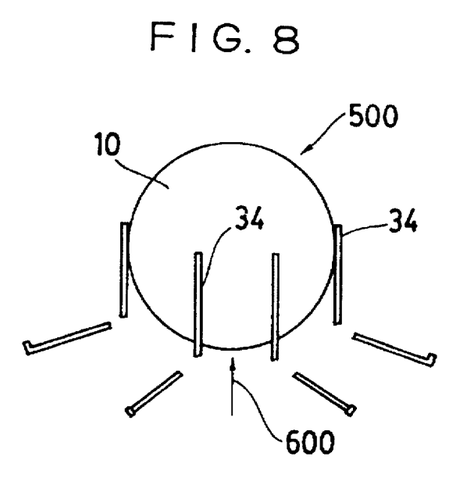
FIG. 8 is a diagram for explaining a detaching step from the ground of the spherical shaped tank main body.

FIG. 8 shows a detaching step from the ground of the tank shell body 10 of the tank 500. In this step, the supporting legs 34 are cut off in order to make the tank 500 to be supported by the above-mentioned supporting force in the direction of the arrow 600.

Figure 9:
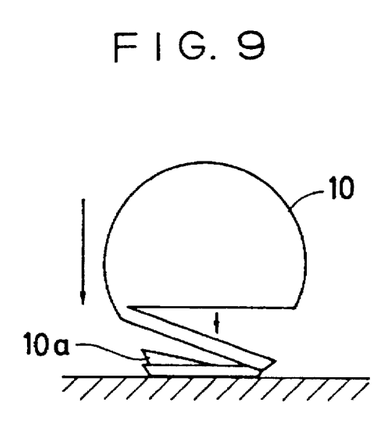
FIG. 9 is a diagram for explaining a cutting step of the spherical shaped tank main body.

Then, FIG. 9 shows a cutting step of the shell body 10 from the lower side to the upper side thereof. In this embodiment for use in the present invention, the shell body 10 is being horizontally cut to have a predetermined cut width. In other word, the shell body 10 is cut in round slices. In this stage, the supporting height of the shell body 10 is continuously descended as the cutting operation is progressed. This means that the operation is always performed at a low spot.

In addition to the above, a band 10a formed by cutting the shell body 10, is falling down a slant with dangling, from the free end of the cut portion as shown in FIG. 9, so that the band can be disposed with utilizing the gravity.

Thus, the dismounting is completes as the cutting is successively carried out. The dismount operation is therefore can be carried out safely, smoothly and quickly without the necessity of conveying each of the cut fragments by means of a crane truck or the like at an elevated spot when the dismount method of the present invention is employed.

It is preferable that the second dismount method of the present invention further comprise a bottom part cutting step for cutting a predetermined region of the bottom of the tank main body to provide an opening, prior to the supporting preparatory step. A jack mechanism as the supporting means can be employed in the case of performing the bottom part cutting step, provided below the opening under such state that the tank main body is supported by the jack mechanism from the inside of the top portion thereof.

The cutting operation is performed from the bottom side to the upper side thereof, also in this case, with the tank main body being descended, so that the previously described various effects can be obtained. The dismount method comprising the bottom part cutting step with utilizing the jack mechanism is effective particularly when there is no space around the tank.

FIGS. 10 to 14 illustrate an embodiment of the dismount method of the present invention in which the tank main body is vertically moved by use of a jack mechanism. The tank in FIGS. 10 to 14 is the same as that employed in FIGS. 6 to 9.

Figure 10:
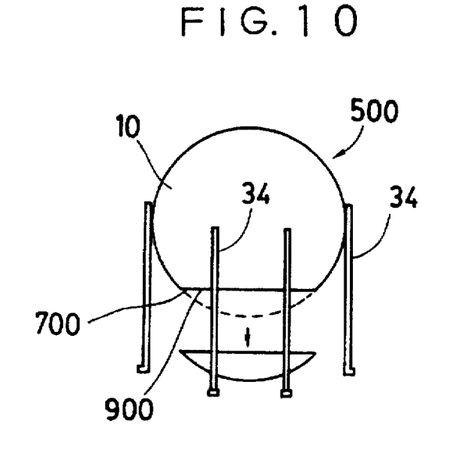
FIG. 10 is a diagram for explaining a bottom part cutting step of a spherical shaped tank main body.

In FIG. 10, a shell body 10 supported by supporting legs 34 is in the bottom part cutting step as a first step employed in this embodiment. The shell body 10 in FIG. 10 is cut off into a circular shape on a line 900 shown at the bottom thereof to form an opening 700. This cutting operation of the bottom part is carried out at a relatively low portion of the shell 10, with the cut portion landed on the ground as it is cut, so that this cut operation can be carried out without much difficulty.

Figure 11:
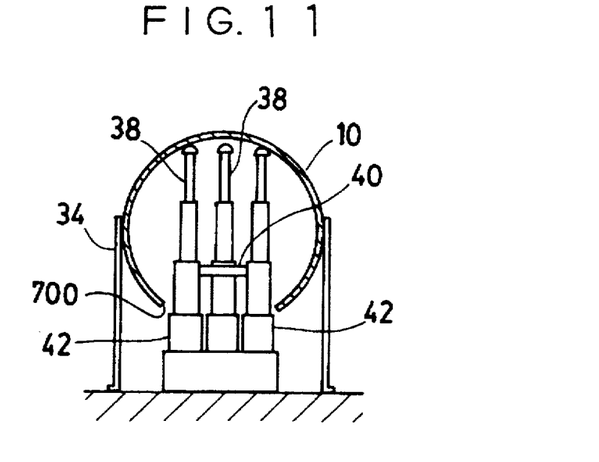
FIG. 11 is a diagram for explaining a supporting preparatory step of the spherical shaped tank main body.

FIG. 11 shows a supporting preparatory step of a spherical shaped tank main body 10. In this figure, a jack mechanism 36 is under the installed state with the upper part thereof being inserted to the shell body 10 through an opening 700 formed at the bottom of the shell body 10. In this step the shell body 10 is still supported by the supporting legs 34. The jack mechanism 36 employed in FIG. 11 comprises supporting posts 38 for pushing up the shell body 10 from the inside thereof. In this embodiment, there are provided three supporting posts 38. Alternatively, it is possible to prepare a single supporting post, or four or more supporting posts which depends on the size of the shell body 10 or the thickness of the supporting post 38.

In this case, each of the supporting posts 38 is connected by means of connection arms 40 in order to stabilize the ascent and descent state of the jack mechanism 36. Each of the supporting posts 38 is caused to move up and down by an ascent and descent unit 42 provided at the lower part thereof. A variety of ascent and descent units such as hydraulic or mechanical ones may be employed, and each supporting post 38 synchronously moves up and down.

It is possible that the jack mechanism 36 as described above is installed as being constructed at the installation position, the lower part of the opening 700 of the shell body 10. In the case where the size of the shell body 10 is small, it is preferable to install the jack mechanism 36 with being constructed.

Then, as shown in FIG. 11, the supporting preparatory step is carried out for supporting the shell body 10 with the supporting posts 38 raised up, and the shell body 10 pushed up from the inside thereof by the own strength of the jack mechanism.

Thus, the supporting preparatory step of the tank main body can be performed without occupying a great deal of space, even when there is not enough space around the tank main body or another tank is there near the tank. This is because, as explained above, the jack mechanism of the present invention supports the shell body from the inside thereof through the opening portion 700 provided at the bottom of the shell body 10.

Figure 12:
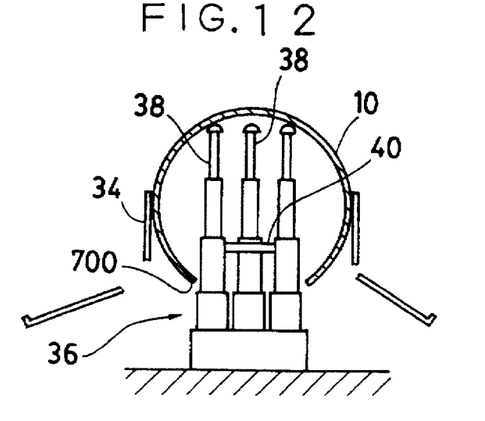
FIG. 12 is a diagram for explaining a detaching step from the ground of the spherical shaped tank main body.

Subsequently, a detaching step from the ground of the tank main body is carried out as shown in FIG. 12 in the same way as in FIG. 8, thereby supporting the shell body 10 only by the jack mechanism 36.

Figure 13:
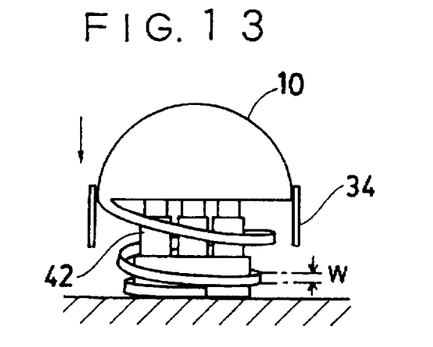
FIG. 13 is a diagram for showing a cutting step of the spherical shaped tank main body.

In the above state, the cutting operation can be performed by that the shell body 10 is cut to form a band with a predetermined width (W) from the bottom edge side thereof as shown in FIG. 13. In the embodiment shown in FIG. 13, the cutting step of cutting the tank main body is carried out so as to draw a swirl line from the bottom edge side of the tank main body toward the upper part thereof to form a band with a predetermined width like an apple is successively peeled off to have the rind with a predetermined width. The jack mechanism 36 may be operated to gradually descend the supporting height of the shell body 10 in the direction of an arrow with the rotary motion, in accordance with the cutting operation. As a result, the operator can successively perform the dismount operation by cutting the shell body 10 at a predetermined height (relatively low spot) even with the spent time shortened. Besides, the collection of the band, obtained by cutting the shell body 10, can be easily performed since the band in the spiral form is hung in order, in the lower direction, and lands on to the ground in a swirl shape.

In the case where the tank main body is rotated during being cut, accompanied with the descent motion of the supporting height, the cutting operation to form a band with a predetermined width can be carried out by use of a burner or the like at one position, that means the dismount operation is smoothly performed.

Figure 14:
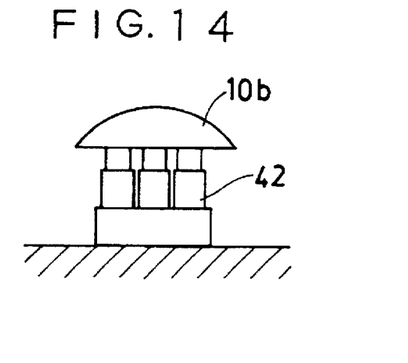
FIG. 14 is a diagram for explaining the state of the spherical tank main body immediately before the completion of the dismounting operation thereof.

Consequently, only a top part 10b shown in FIG. 14 remains by the successive peel-off cutting performance. This state of the tank main body is immediately before the completion of the dismounting operation. Then, the top part 10b which has come to a relatively low position is removed, whereby the tank main body dismount operation is completed.

Thus, the dismount operation of a spherical shaped tank is easily and smoothly completed because of the cutting operation at a low spot, the supporting and descending operation of the main body by means of the jack mechanism 36 of the present invention, and the successive cutting operation.

Furthermore, the present invention proposes a first jack mechanism comprising a plurality of extendable supporting posts for supporting the spherical tank main body by pushing up the same, an ascent and descent unit for causing each upper end of the extendable supporting posts to move ea and down provided on the back side of the extendable supporting posts, rotation members for rotating the spherical tank main body in the horizontal direction, under the state of contacting with the inner surface of the tank main body, each provided on the top of said extendable supporting post, and a rotary driving unit for rotary driving at least one of the rotation members provided in a contact state with the extendable supporting post.

The tips of a plurality of extendable supporting posts in the above jack mechanism is caused to move up and down because of the ascent and descent unit, and the tank main body can be rotated in the horizontal direction with being supported because of the rotation members and the rotary driving unit, whereby the cutting operation by use of this jack mechanism can be also performed without changing the cutting position.

It is preferable that the jack mechanism further comprise connection arms for connecting the extendable supporting posts each other for obtaining a stable installation state of the supporting posts.

Figure 15:
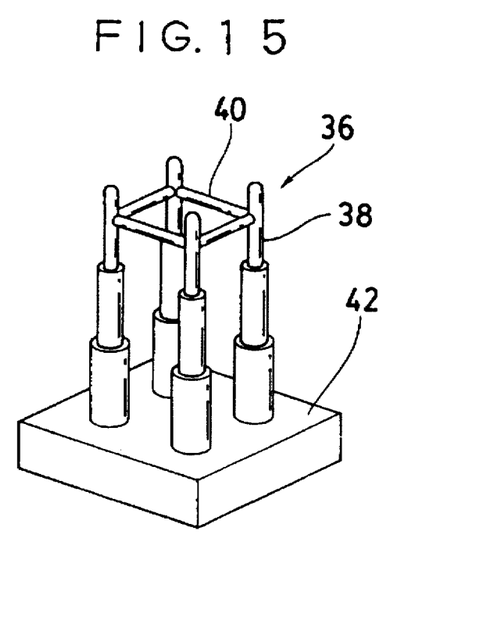
FIG. 15 is a structural diagram for showing a jack mechanism with four supporting posts.

FIG. 15 shows a structural embodiment of a jack mechanism 36 employed for the above-mentioned dismounting method of the present invention. A jack mechanism 36 in FIG. 15 has the structure comprising four supporting posts 38, connected by means of connection arms 40 each other. In FIG. 15, the tips of the supporting posts 38 are schematically illustrated.

In this embodiment, an ascent and descent unit for causing the tip of each supporting post 38 up and down is contained in a housing with an integral structure, although this is not limiting the present invention, and it is possible to have an individual ascent and descent unit 42 for each supporting post 38.

Figure 16:
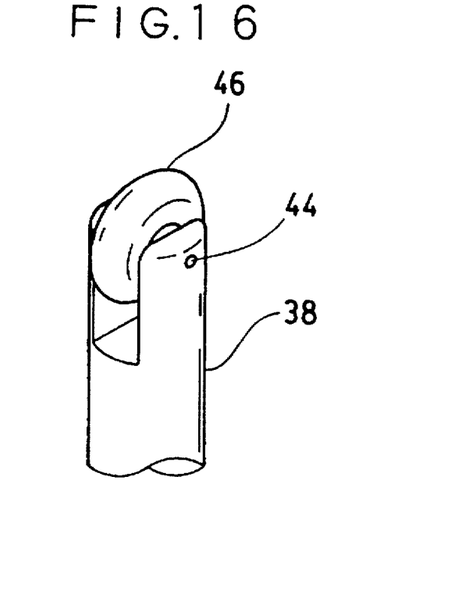
FIGS. 16, 17 and 18 are structural diagrams, each for showing a part of a jack mechanism for rotating a tank main body.
Figure 17:
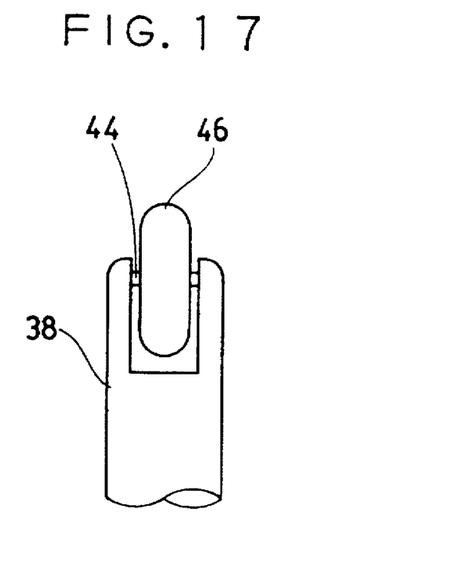

FIGS. 16 and 17 show concrete structural embodiments of the tips of the supporting posts 38. As shown in these figures, a rotation member 46 is provided at the tip of the supporting posts 38, rotatably supported by an axis 44. An elastic member such as rubber is provided on the rotation member 46 on the surface thereof. The jack mechanism of the present invention is designed to have the tip of the rotation member 46 for pushing up the top portion of a tank main body from the inside thereof. The rotation members 46 cause to rotate the tank main body in the horizontal direction under the state of supporting the same. In other words, the rotation member 46 rotates centering around the axis 44 when the tank main body is horizontally rotated.

Figure 18:
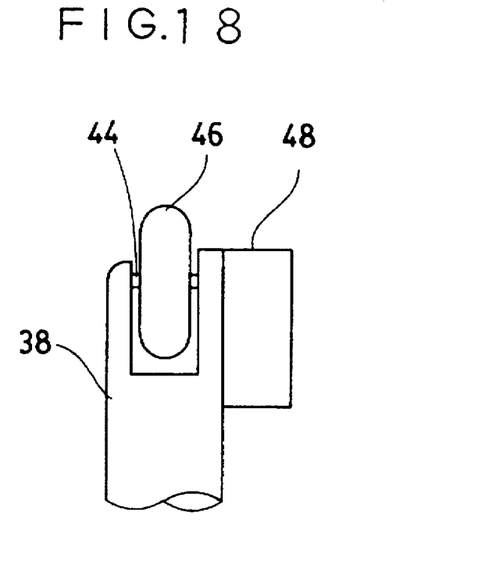

FIG. 18 is a diagram showing an embodiment of the supporting post 38 at the tip thereof when a rotary driving unit 48 is provided on at least one supporting post 38 for rotary driving a rotation member 46 around an axis 44. Accordingly, the rotary driving unit 46 automatically rotates the tank main body corresponding to the rotation of the rotation member 46. The tank main body supported by the rotation member 46 is simultaneously rotated. Thus, it is possible to perform the cutting operation of the tank main body all around the periphery without changing the place to perform the cutting operation in the course of the cutting step shown in FIG. 13, since the above-mentioned rotation is performed so as to correspond to the cutting speed.

The second jack mechanism of the present invention comprises a substrate which is rotatable in the horizontal direction, at least one extendable supporting post for supporting the spherical tank main body by pushing up the same provided on the substrate, an ascent and descent unit for causing the upper end of the extendable supporting post to move up and down provided on the back side of the extendable supporting post, and a substrate driving unit for rotating the substrate with the spherical tank main body supported by said extendable supporting post, provided on the back surface of the substrate.

When the above jack mechanism is employed, the tank main body is horizontally rotated, so that the dismount operation by cutting the tank main body from the bottom thereof is smoothly performed as mentioned previously.

It is preferable that the jack mechanism further comprise connection arms for connecting a plurality of extendable supporting posts, to obtain a stable installation state of the supporting posts.

Figure 19:
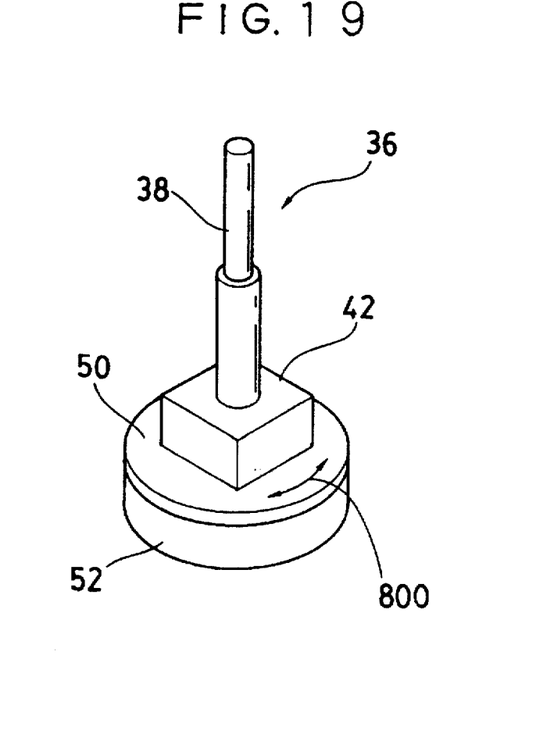
FIGS. 19 and 20 are structural diagrams each for showing an embodiment of a jack mechanism with a substrate driving unit.
Figure 20:
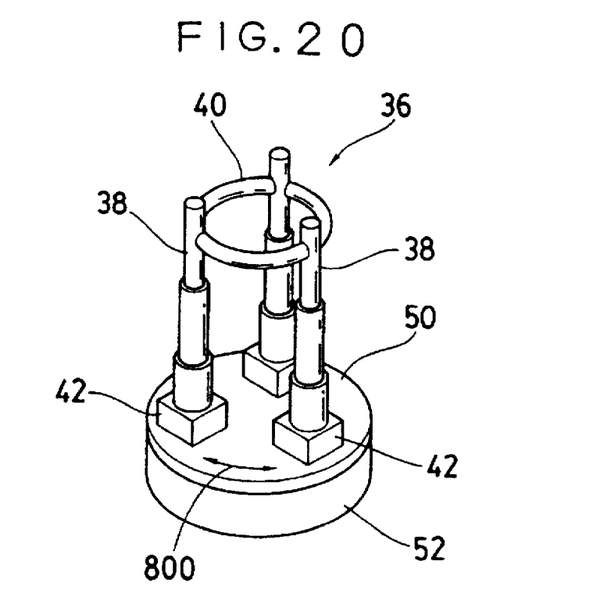

FIGS. 19 and 20 are diagrams for showing specific embodiments of jack mechanisms 36 in which supporting posts 38 themselves rotary drive or circularly drive in order to rotate the tank main body supported by the supporting posts 38.

FIG. 19 shows a jack mechanism 36 to support a tank main body only by a single supporting post 38, and an ascent and descent unit 42 for moving the tip of the supporting post 38 up and down is provided on a substrate 50. The substrate 50 rotates in the direction of an arrow 800 by means of a substrate driving unit 52.

FIG. 20 shows an embodiment of a jack mechanism 36 comprising three supporting posts 38 connected by connection arms 40, provided on the substrate 50. In this embodiment, all of the supporting posts 38 circularly move simultaneously, by the rotary motion of the substrate 50 in the direction of an arrow 800. Accordingly, the shell body as a tank main body to be provided on the supporting posts 38 rotary moves, supported at three points. Reference numeral 42 indicates an ascent and descent unit, and reference numeral 52, a substrate driving unit also in FIG. 20.

As can seen from the above, it is possible to easily and smoothly perform the tank main body cutting operation of the dismount method according to the present invention by using the jack mechanism which causes to rotate the tank main body with supporting the same. More specifically, the operators can perform the cutting operation of the tank main body from the bottom edge side thereof to form a band with a predetermined width by using a substance such as a burner or an ultra-high-pressure water jet apparatus. And they cut all of the periphery of the tank main body 10 without changing the cutting position. This is because the tank main body 10 supported by the jack mechanism can be rotated in accordance with the cutting speed. Moreover, the height of the tank main body supported by the jack mechanism of the present invention can be gradually descended, so that the cutting operation of the shell body can be carried out at almost the same height, the band with a predetermined width being produced, until the cutting operation is completed.

The dismount method and the jack mechanism employed therefor of the present invention contribute to the laborsaving, for example to achieve the unmanned dismount operation.

As mentioned previously, the present invention is not limited to the embodiment with the structure described above, and can variously be modified without deviating from the essential points of the present invention. For instance, it is possible that the jack mechanism has a structure only for the ascent and descent motion of the tank main body without the rotary motion, and the cutting operation is carried out with the cutting position being changed into the peripheral direction of the shell body.

To conclude, the method for dismounting a large sized tank by cutting the same and the jack mechanism employed therefor according to the present invention is effective since the dismounting operation by use of the method and/or the jack mechanism of the present invention is appropriately carried out even when there is not enough space around the large sized tank. Moreover, the time for the dismounting operation is substantially decreased when the method of the present invention is employed in comparison with the time spent when the conventional method is employed. Furthermore, the operating time at an elevated spot is reduced to a large extent or even eliminated, thereby securing the safety. It is also possible to reduce the wages for the dismount operation and minimize the adverse effect to the neighborhood of the dismount job site.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of disassembling a large-sized tank, comprising the step of:

cutting the tank continuously along a swirly path from a top central position thereof to a bottom thereof, thereby forming only one continuous band with a predetermined width, whereby as the cutting step progresses, the weight of said band increases, causing said band to fall into said tank.

2. The method of claim 1 comprising the step of continuously pulling down the band simultaneously with said cutting step.

3. The method of claim 2, wherein said pulling step includes pulling down said band into said tank.

4. The method of claim 3 comprising the step of making an opening in the tank at the bottom thereof prior to said pulling step, and wherein said pulling step includes pulling said band through said opening to the outside of said tank.

* * * * *